United States Patent
Ho et al.

(10) Patent No.: US 7,911,085 B2
(45) Date of Patent: Mar. 22, 2011

(54) POWER SAVING UNINTERRUPTIBLE POWER SUPPLY

(75) Inventors: Lien-Hsun Ho, Taipei (TW); Shou-Ting Yeh, Taipei (TW); Hung-Ming Hsieh, Taipei (TW)

(73) Assignee: Cyber Power System Inc., Taipei (TW)

( * ) Notice: Subject to any disclaimer, the term of this patent is extended or adjusted under 35 U.S.C. 154(b) by 0 days.

(21) Appl. No.: 12/460,935

(22) Filed: Jul. 27, 2009

(65) Prior Publication Data
US 2009/0289504 A1 Nov. 26, 2009

Related U.S. Application Data

(63) Continuation-in-part of application No. 12/008,936, filed on Jan. 15, 2008, now abandoned.

(51) Int. Cl.
*H02J 9/06* (2006.01)
(52) U.S. Cl. ........................................... 307/66; 307/64

(58) Field of Classification Search ............... 307/64–66
See application file for complete search history.

(56) References Cited

U.S. PATENT DOCUMENTS

| | | |
|---|---|---|
| 5,229,650 A | 7/1993 | Kita et al. |
| 2004/0036361 A1 | 2/2004 | Dai et al. |
| 2010/0237701 A1* | 9/2010 | Yeh et al. .................. 307/66 |

* cited by examiner

*Primary Examiner* — Fritz M Fleming
(74) *Attorney, Agent, or Firm* — William E. Pelton, Esq.; Cooper & Dunham LLP

(57) ABSTRACT

The power saving uninterruptible power supply (UPS) has a first and second switches, an energy spared switch, a transformer, an automatic voltage regulator (AVR), a charger-and-inverter, a normal mode determination unit and an electric switch. When the utility power is stable, the first and second switches are connected together to supply the utility power to a load. At the time, the energy spared switch is physically disconnected with the utility power and the transformer and the AVR. Therefore, the transformer and AVR do not consume more energy of the utility power and the transforming efficiency of the UPS is increased.

6 Claims, 3 Drawing Sheets

POWER SAVING UNINTERRUPTIBLE POWER SUPPLY

The present invention is a continuation-in-part (CIP) application claiming the benefit of U.S. patent application Ser. No. 12/008,936 filed on Jan. 15, 2008 now abandoned.

BACKGROUND OF THE INVENTION

1. Field of the Invention

The invention relates in general to an uninterruptible power supply (UPS), and more particularly to a power saving UPS that has low power consumption.

2. Description of the Related Art

In general, UPS has three types, a first one is on-line UPS, a second one is off UPS and a third one is line interactive UPS. With reference to FIG. 3, an improved on-line UPS 60 is disclosed by U.S. Pat. No. 5,229,650 and has a rectifier 61, an inverter 62, a charger 63, a battery 631 and a control signal generator 64. The rectifier 61 is coupled to a utility power and inputs of the inverter 62. The charger 63 is connected to the battery 631 and the utility power through a first switch SW1. The battery 631 is connected to the inputs of the inverter 62 through a second switch SW2. The control signal generator 64 is connected to the utility power, the battery 631 and the first and second switches SW1, SW2 to drive the first and second switches SW1, SW2. Outputs of the inverter 62 are connected to a load 65.

When the utility power is stable, the rectifier 61 converts the utility power to a DC power source and then outputs the DC power source to the inputs of the inverter 62. The inverter 62 converts the DC power source to the AC power source for the load 65. At the time, the control signal generator 64 detects that utility power is stable and further determines whether electricity of the battery 631 is full or not. If determining result is positive, the first switch SW1 is driven to open by the control signal generator 64. If not, the control signal generator 64 drives to the first switch SW1 to close. The utility power outputs to the charger 63 and then the charger 63 charges to the battery 631.

When the control signal generator 64 detects that the utility power is unstable or interrupted, the control signal generator 64 drives the first switch SW1 to open and the second switch SW2 to close. Another DC power source from the battery 631 is supplied to the inputs of the inverter 62. The inverter 62 converts the DC power source to the AC power source for the load 65. Therefore, the load 65 can still operate normally even the utility power is unstable or interrupted. Since the on-line UPS 60 has the control signal generator 64 and the first switch SW1, the battery 631 is not continuously charged by the charger 63, so the battery life can be increased.

In general, the line-interactive UPS further requires a voltage regulation transformer (hereinafter AVR) to stable the unstable utility power. The DC power source of the battery is only supplied to the inverter at a condition that the utility power is interrupted. Therefore, the line-interactive UPS provides the stable AC power source to the load. However, the AVR has a huge size, low transforming efficiency etc. drawbacks. Therefore, US 2004/0036361 patent proposes an improved line-interactive UPS. With reference to FIG. 4, the line-interactive UPS 70 has a bi-directional AC to AC power converter 71, a first switching unit 72, a second switch 73 and a third switch 74. The first switching unit 72 has two switches SWA respectively connected to a line terminal A and a neutral terminal B of the AC to AC power converter 71. Common nodes of the second and third switches 73, 74 are respectively connected to a load 75. Two switching nodes of the second switch 73 are respectively connected to the line terminal A and a line output terminal B of the AC to AC power converter 71. Two switching nodes of the third switch 74 are connected to the line terminal A and the neutral terminal B of the AC to AC power converter 71. When the utility power is stable, the first switching unit 72 is closed and the load 75 is connected to the line terminal A and the neutral terminal B of the AC to AC power converter 71. Therefore, the utility power is supplied to the load 75 directly. When line voltage of the utility power exceeds a high standard value, only the second switch 73 is switched to connect the neutral output terminal C of the AC to AC power converter 71. When the utility power is interrupted, the second switch 73 is switched to connect the neutral output terminal B of the AC to AC power converter 71 and the third switch 74 is switched to connect the line terminal A of the AC to AC power converter 71. Since the AC to AC power converter 71 does not uses a transformer, the size of the line-interactive UPS is decreased and the transforming efficiency is increased.

The above line-interactive UPS does not require the AVR and the line-interactive UPS also does not other advantages of the AVR.

SUMMARY OF THE INVENTION

An objective of the present invention is to provide a power saving uninterruptible power supply (UPS). The power saving uninterruptible power supply (UPS) in accordance with the present invention not only provides emergency power supply, but also effectively resolves the drawback of over-consuming power.

The power saving UPS has a first and second switches, an energy spared switch, a transformer, an automatic voltage regulator (AVR), a charger-and-inverter, a normal mode determination unit and an electric switch. When the utility power is stable, the first and second switches are connected together to supply the utility power to a load. At the time, the energy spared switch is physically disconnected with the utility power and the transformer and the AVR. Therefore, the transformer and AVR do not consume more energy of the utility power and the transforming efficiency of the UPS in accordance with the present invention is increased.

Other objective, advantages and novel features of the invention will become more apparent from the following detailed description when taken in conjunction with the accompanying drawings.

DETAILED DESCRIPTION OF THE INVENTION

Figure 1:
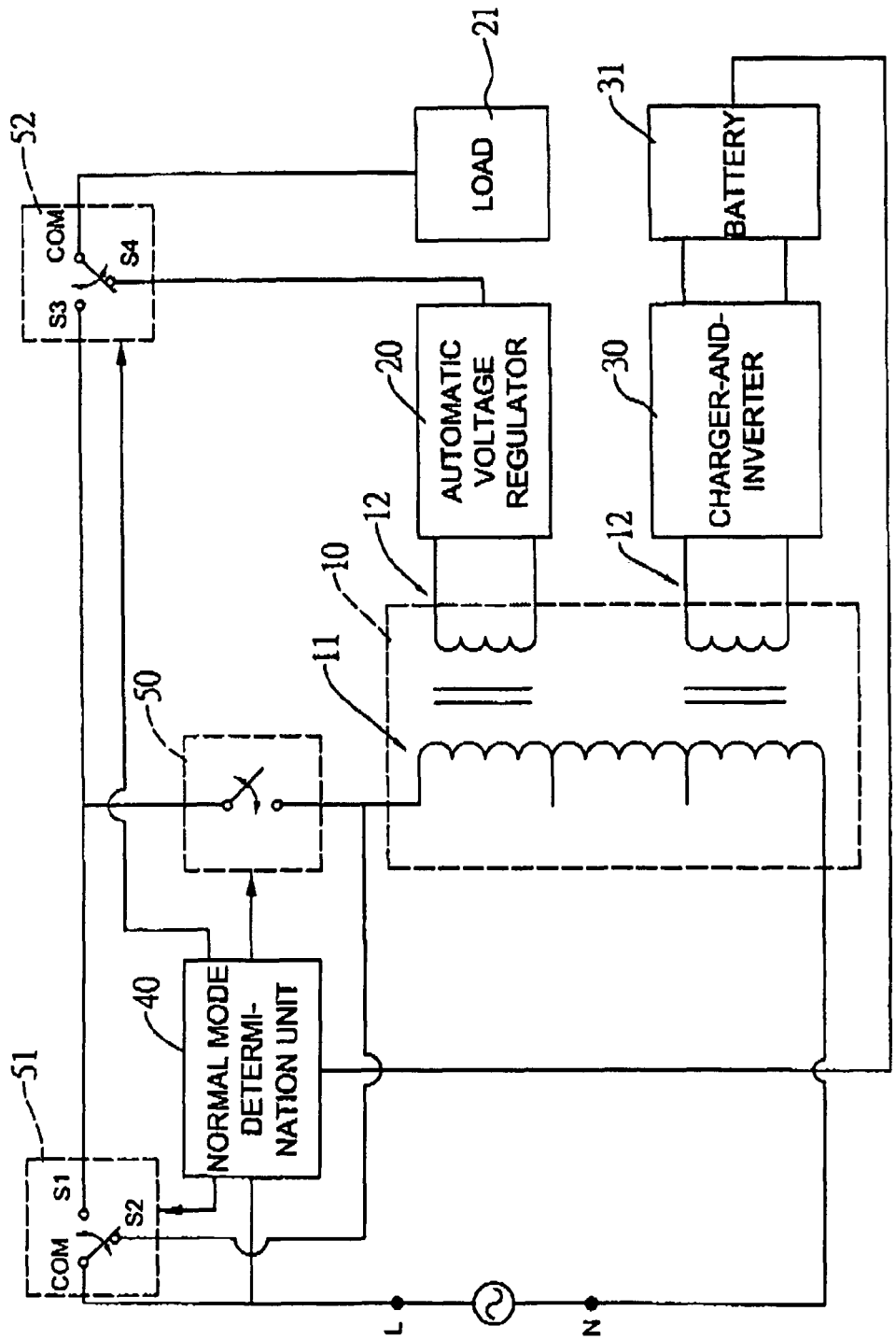
FIG. 1 is a block diagram of a uninterruptible power supply (UPS) in accordance with the present invention.
Figure 2:
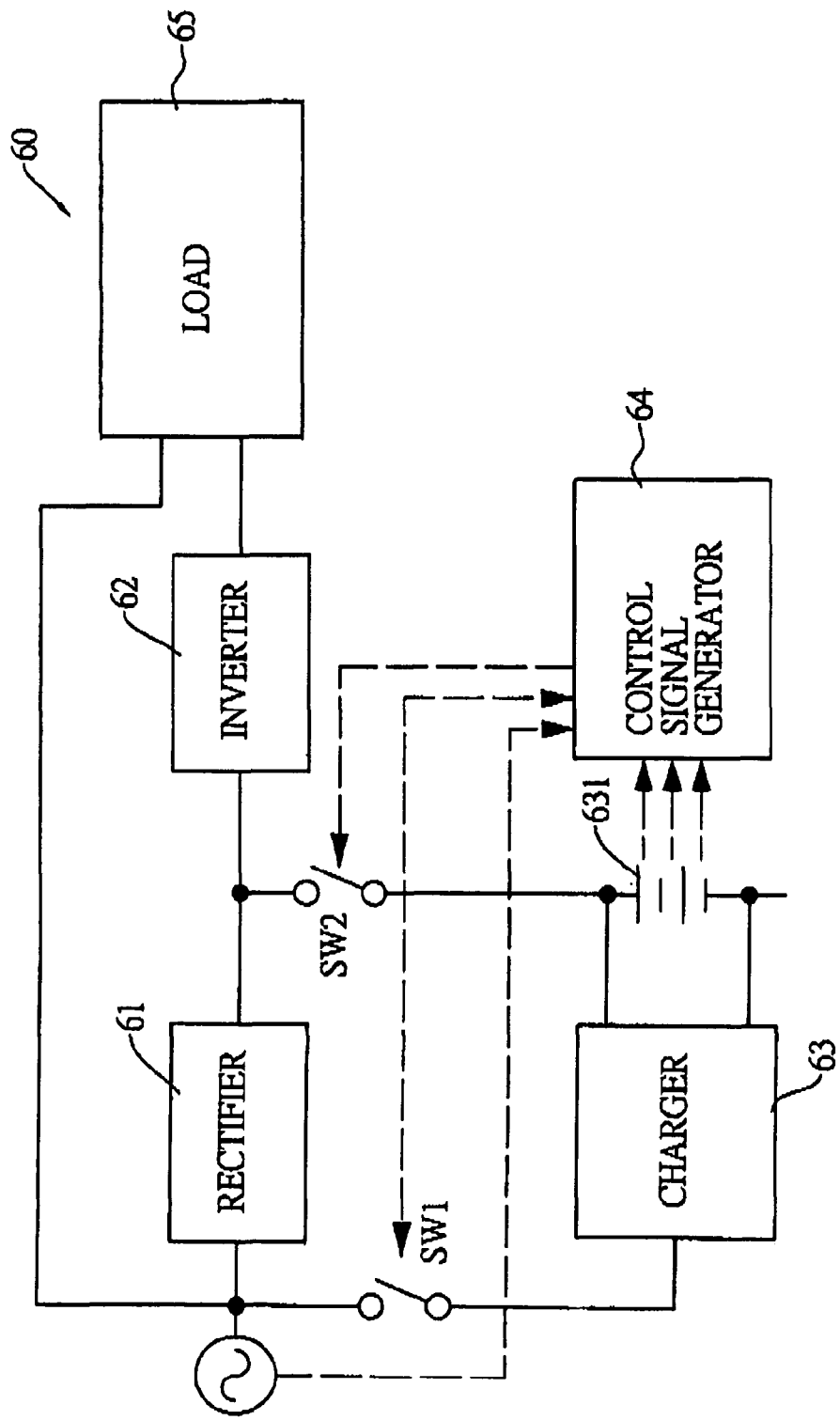
FIG. 2 is a block diagram of a conventional on-line UPS in accordance with the prior art.
Figure 3:
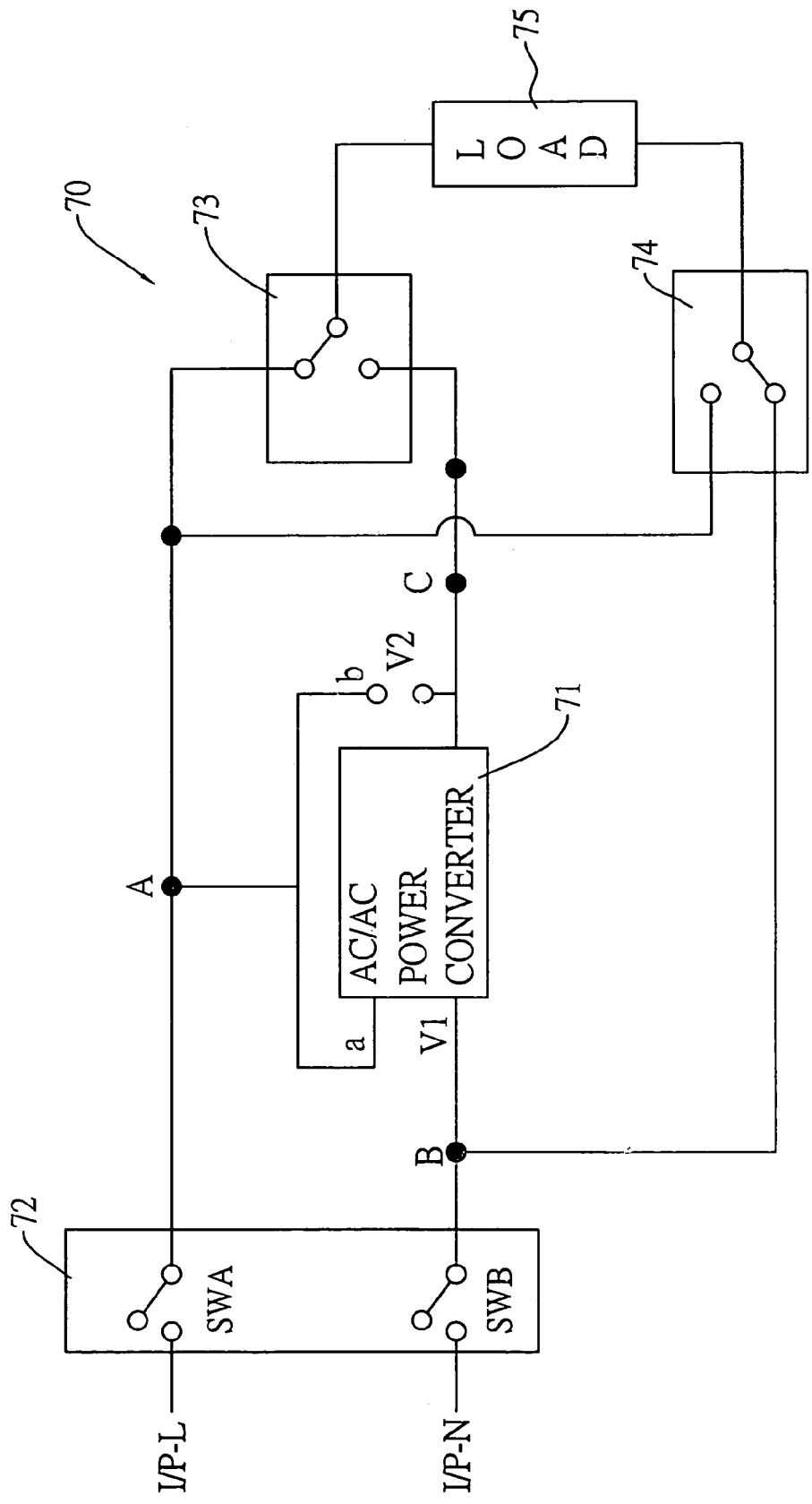
FIG. 3 is a block diagram of a conventional line-interactive UPS in accordance with the present invention.

With reference to FIG. 1, a power saving uninterruptible power supply (UPS) in accordance with the present invention has a power coupling terminals L,N, a transformer 10, an automatic voltage regulator (AVR) 20, a charger-and-inverter 30, a normal mode determination unit 40, a first switch 51, a second switch 52 and an energy spared switch 50. The transformer 10 has a primary winding 11 and a secondary winding 12.

The power coupling terminals L, N have a line terminal L and a neutral terminal N and are coupled to a utility power. One end of the transformer 10 is connected to one of the power coupling terminals L through the energy spared switch 50. That is, two nodes of the energy spared switch 52 are respectively connected to the end of the primary winding 11 and the utility power. The other end of the transformer 10 is connected to the other power coupling terminals N. In the embodiment, the energy spared switch 50 is connected between the line terminal L and one end of the primary winding 11. The energy spared switch 50 may be a relay, a MOS transistor or other electric devices that can be used as a switch.

The first switch 51 has a common node COM, a first and second switching nodes S1, S2. The common node COM is selectively connected to the first and second switching nodes S1, S2. The power coupling terminal L to which the energy spared switch 50 is connected is further connected to the first switching node S1 of the first switch 51. The common node COM of the first switch 51 is coupled to the utility power. Therefore, the utility power is directly supplied to the primary winding 11 of the transformer 10 when the common node COM is connected to the second switching node S2.

The second switch 52 has a common node COM, and a third and fourth switching nodes S3, S4. The common node COM is used as a power output of the UPS, so the common COM of the second switch 52 is connected to the load 21. The third switching node S3 is connected to a first switching node S1 of the first switch 51 and the energy spared switch 50.

The AVR has inputs and an output. The inputs of the AVR 20 are coupled to the secondary winding 12 of the transformer 10 to acquire an inducted utility power. The output of the AVR 20 is connected to the fourth switching node S4 of the second switch 52. Then the AVR 20 regulates the inducted AC power source to output to a load 21 when the second switch 52 switches to connect to the output of the AVR 20.

The charger-and-inverter 30 is coupled to the secondary winding 12 of the transformer 10. Hence the charger-and-inverter 30 acquires a recharged power source to convert to a recharged current. Then the charger-and-inverter 30 charges the battery 31 or also converts the DC power source of the battery 31 to the utility power to output to the inputs of the AVR 20 through the transformer 10. Then the AVR 20 regulates the utility power to provide an emergency power supply for the load 21.

The normal mode determination unit 40 has input terminals and an output terminal. The input terminals are coupled to the utility power and the battery 31. Therefore, the normal mode determination unit 40 detects the utility power and determines a stable status, an unstable status or an interrupted status of the utility power. The output terminal of the normal mode determination unit 40 is connected to the energy spared switch 50, so the normal mode determination unit 40 drives the energy spared switch 50 to open or close.

The normal mode determination unit 40 has a microprocessor unit. Each input terminal of the microprocessor unit has an analog-to-digital converter. Hence analog signals of the detected AC power source and the battery capacity can be converted to corresponding digital detection signals. In this way, the microprocessor unit can determine whether the utility is stable and the battery capacity is sufficient.

If the utility power is stable and the battery capacity is sufficient, the microprocessor unit of the normal mode determination unit 40 determines that the utility power is stable. The microprocessor unit then drives the energy spared switch 50 to open to disconnect a connection of the transformer 10 and the utility power. At the time, the common nodes COM of the first and second switches 51, 52 are respectively connected to the first switching node S1 and third switching node S3. Therefore, the stable utility power is directly coupled to the load 21.

On the contrary, if the microprocessor unit determines that the utility power is unstable, the microprocessor unit drives the energy spared switch 50 to close and the common node COM of the second switch 52 is connected to the fourth switching node S4. The transformer 10 is connected to the utility power through the energy spared switch 50 and the first switch 51. Therefore, the unstable utility power is supplied to the transformer 10 first and the AVR regulates the unstable utility power to the stable utility power to the load through the second switch 52.

Furthermore, if the microprocessor unit determines that the battery capacity of the battery 31 is reducing, the microprocessor unit also immediately drives the electric switch 50 to close. Since the transmitter 10 is coupled to the utility power, the battery 31 acquires the recharged power source via the charger-and-inverter 30 and the transformer 10.

If the microprocessor determines that the utility power is interrupted, the energy spared switch 50 is driven to open and the common nodes COM of the first and second switches 51, 52 are respectively connected to the second switching node S2 and fourth switching node S4. Therefore, the charger-and-inverter 30 converts the DC power source to the stable utility power to the load through the transformer 10 and the AVR 20.

Based on the foregoing description, the transformer and AVR is physically disconnect with the utility power and load, so the transformer and AVR does not consume more energy of the utility power. Therefore, the transforming efficiency of the UPS in accordance with the present invention is increased.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power saving uninterruptible power supply comprising:
   two power coupling terminals adapted to connect to a utility power;
   a first switch having a common node and a first and second switching nodes, wherein the common node is connected to one of the power coupling terminals;
   a second switch having a common node and a third and fourth switching nodes, wherein the common node of the second switch is adapted to connected to a load and the third switching nodes of the second switch is connected to the first switching node of the first switch;
   a power spared switch has two nodes, wherein one node of the power spared switch is connected to first switching node of the first switch;
   a transformer having:
      a primary winding has two ends, wherein one end of the primary winding is connected to the other node of the energy spared switch and the second switching node of the first switch, and the other end is connected to the other of power coupling terminals; and
      a secondary winding;
   an automatic voltage regulator having inputs and a output, wherein the inputs are connected to the secondary winding and the output is connected to the fourth switching node of the second switch;

a charger-and-inverter coupled to the secondary winding of the transformer to acquire a recharged power source to convert to a recharged current, and then the charger-and-inverter charges a battery; and a normal mode determination unit having input terminals and an output terminal, wherein the input terminals are connected to the battery and the utility power to determine a current status of the utility power and a battery capacity, and the output terminal is connected to the energy spared switch, and the normal mode determination unit drives the energy spared switch according to a determination result.

2. The power saving uninterruptible power supply as claimed in claim 1, wherein the normal mode determination unit comprises a microprocessor unit, wherein the microprocessor unit has a built-in determination procedure, wherein each input terminal of the microprocessor unit has an analog-to-digital converter to be coupled to the utility power and the battery, so as to convert analog signals of the detected AC power source and the battery capacity to corresponding digital detection signals.

3. The power saving uninterruptible power supply as claimed in claim 2, wherein:

the first switching node of the first switch is connected to the third switching node of the second switch, and the microprocessor unit drives the energy spared switch to open to disconnect a connection of the transformer and the utility power when the utility power is stable and the battery capacity is sufficient;

the second switch is connected to the output of the automatic voltage regulator and disconnected with the first switch, and the microprocessor unit drives the energy spared switch to close to connect the transformer to the utility power when the utility power is unstable or the battery capacity is sufficient;

the first switch is connected to the end of the primary winding of the transformer, the second switch is connected to output of the automatic voltage regulator, and the microprocessor unit drives the energy spared switch to open when the utility power is interrupted.

4. The power saving uninterruptible power supply as claimed in claim 1, wherein the energy spared switch can be a relay or a MOS transistor.

5. The power saving uninterruptible power supply as claimed in claim 2, wherein the energy spared switch can be a relay or a MOS transistor.

6. The power saving uninterruptible power supply as claimed in claim 3, wherein the energy spared switch can be a relay or a MOS transistor.

* * * * *